UNITED STATES PATENT OFFICE.

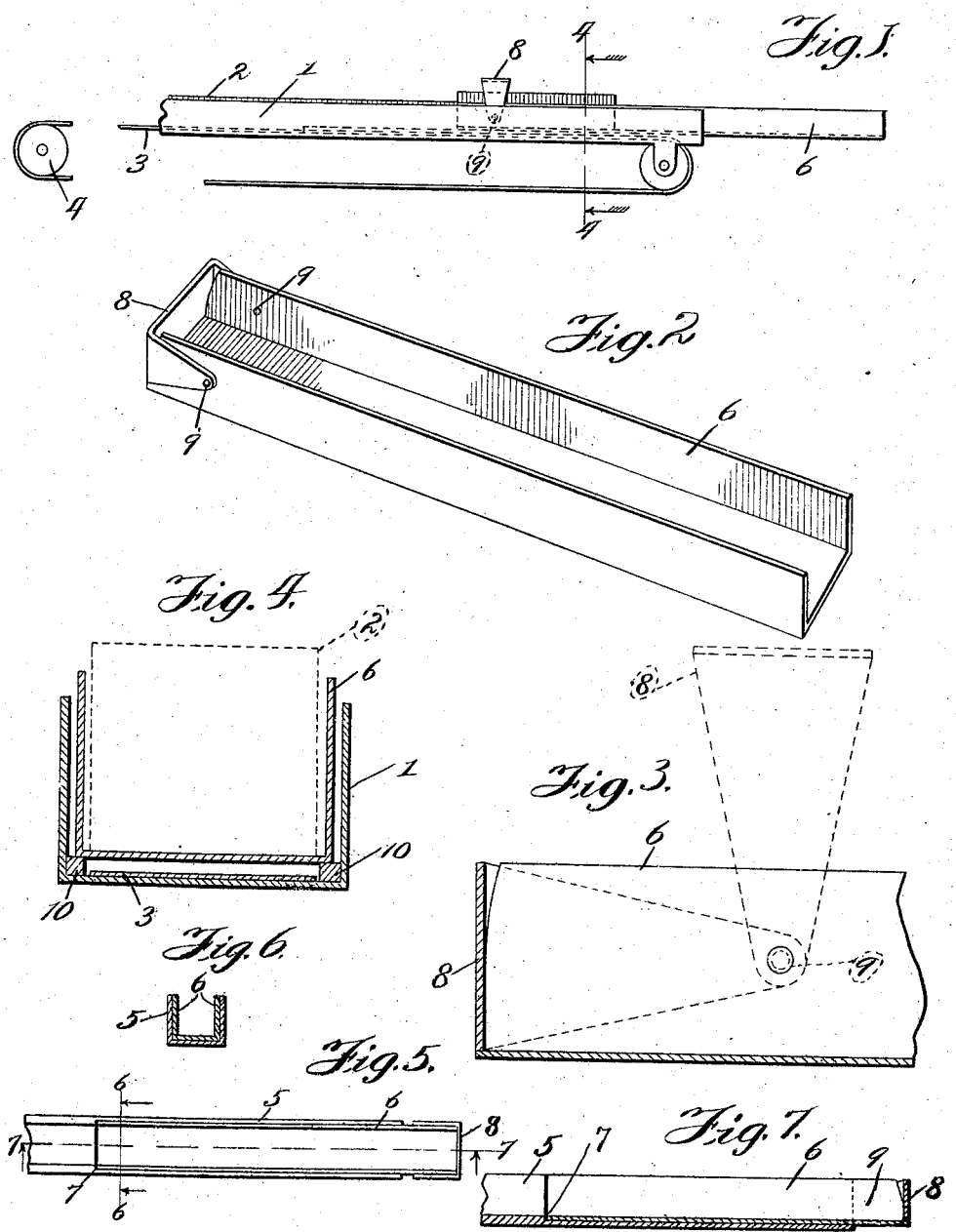

SANDFORD C. COX, OF CHICAGO, ILLINOIS, ASSIGNOR TO THE COX MULTI-MAILER CO., OF SIOUX FALLS, SOUTH DAKOTA, A CORPORATION OF SOUTH DAKOTA.

GALLEY FOR ADDRESSING-MACHINES.

No. 855,097.   Specification of Letters Patent.   Patented May 28, 1907.

Application filed May 1, 1905. Serial No. 258,384.

*To all whom it may concern:*

Be it known that I, SANDFORD C. COX, a citizen of the United States, residing at Chicago, county of Cook, and State of Illinois, have invented certain new and useful Improvements in Galleys for Addressing-Machines, of which the following is a full, clear, and exact specification.

In some forms of addressing machines the slugs or linotypes from which the addresses are printed, are fed into a race continuously and as they are discharged from the addressing machine are fed back into a delivery or return race in the same order of arrangement in which they enter the machine and it is desirable to remove them from the return race as the latter fills with them, and store them away in the same order for the next run so that they may be quickly and conveniently placed back in the machine a second time in the same order in which they were placed therein the first time.

My invention relates to a galley for receiving a large number of the slugs from the return race and inserting the same back again in the feed race in proper order, and my invention has for its primary object to provide an efficient and simple device for this purpose by which the slugs may be quickly handled and restored to the feed race in regular order.

With a view to the accomplishment of this object and certain other objects that will hereinafter appear, the invention consists in the features of novelty which I will now describe with reference to the accompanying drawings and then more particularly point out in the claims.

In the said drawings—Figure 1 is a side elevation of the feed race partially broken away, showing the galley entering the same. Fig. 2 is an enlarged perspective of the galley. Fig. 3 is an enlarged vertical longitudinal section of one end of the galley, showing the gate elevated in dotted lines. Fig. 4 is an enlarged transverse section on the line 4, 4, Fig. 1. Fig. 5 is a plan view of one end of the return race with the charging galley arranged therein to receive the slugs, and Fig. 6 is a cross section and Fig. 7 a longitudinal section thereof.

1 is the feed race for the slugs, 2, and which is shown herein as a rectangular trough upon whose bottom lies the upper fold, 3, of an endless traveling belt passing over pulleys or rollers, 4, and being driven by any suitable means in the proper direction, not necessary to be described in this specification. The of the belt and are thereby caused to travel slugs, 2, rest directly upon this upper fold, 3, forwardly along the race, 1, to their proper destination where the mechanism for receiving and printing from them is situated. After the slugs are printed from they are ejected or placed by any suitable means in the aforesaid return race, the end of which is shown at 5 in Fig. 5, and they are automatically pushed along this race in the same order of arrangement as they enter the race, 1, but as the race 5 fills with them it is of course necessary to remove them therefrom in bulk and store them away for future use. In order to do this, a galley, 6, is telescoped with the race 5, the race 5 being provided with a recess or channel, 7, (see Fig. 6) complementary in form to the cross section of the galley 6 which is inserted therein from one end, so that as the slugs push along to the end of the race 5, the finger of the operator may be inserted between them at the inner extremity of the galley 6 and the entire row throughout the length of the galley 6 pulled out of the race, 5, while the galley 6 is being withdrawn, thereby transferring this row of slugs into the galley 6. Inasmuch as the first one out of the race 5 was the first one into the race 1 it follows that they should be returned to the race 1 in the reverse order in which they are received in the galley 6. As it is quite essential to provide the end of the galley 6 with means for preventing the slugs from falling down therein and this end is always the outer end when the galley 6 is in place in the race 5, it is necessary to provide such outer end of the galley 6 with a removable gate, 8, pivoted at 9 to the side of the galley 6 and adapted to be turned upwardly out of the way as shown in Fig. 1, when that end of the galley is inserted in the race 1 for returning the slugs to the latter in the same order in which they were printed from the first time. When the galley 6 is thus inserted in the race 1 the slugs are pushed out of the galley 6, past the gate, 8, and upon the moving belt, 3, which induces them to move forward in the race 1.

In order that the galley 6 when inserted in the race 1 may not bear unduly upon the belt, 3, the sides of the race 1 are provided with flanges or tracks, 10, upon which the galley 6 is supported and slides.

With this device it will be seen that long lines of the slugs may be received from the return race 5 into the galley 6 and then turned end for end and again inserted into the feed race 1 without reversing the order of their arrangement.

Having thus described my invention, what I claim as new therein and desire to secure by Letters Patent, is:

1. In a device for the purpose described the combination of a feed race for the slugs, a galley adapted to be inserted in said feed race, for holding a supply of slugs, and a gate at the inner end of said galley, pivoted to the sides thereof and having a cross member adapted to turn down across the end of the galley to hold the slugs in and to stand across the top of the galley at a sufficient elevation to permit the slugs to be pushed thereunder.

2. In a device for the purpose described, the combination of a feed race for the slugs, means movable in said race for feeding the slugs forward, a galley for charging the race with slugs adapted to be inserted therein, and means in the race for holding the galley aloof from said feeding means.

3. In a device for the purpose described, the combination of a feed race for the slugs, means in said race for feeding the slugs forward, a galley for charging said race adapted to be inserted therein, tracks or flanges in said race for supporting said galley, and a hinged gate at one end of said galley.

SANDFORD C. COX.

Witnesses:
FRANCIS A. HOPKINS,
A. M. UHER.